(12) United States Patent
Andras et al.

(10) Patent No.: US 6,991,410 B2
(45) Date of Patent: Jan. 31, 2006

(54) TOOLHOLDER ASSEMBLY

(75) Inventors: Linn R. Andras, Ligonier, PA (US);
John J. Baca, Youngstown, PA (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/681,415

(22) Filed: Oct. 8, 2003

(65) Prior Publication Data

US 2005/0079019 A1 Apr. 14, 2005

(51) Int. Cl.
*B26D 3/00* (2006.01)

(52) U.S. Cl. ........................... 407/107; 407/46

(58) Field of Classification Search ............... 407/107, 407/103, 33, 104, 109, 34, 46, 49, 67
See application file for complete search history.

(56) References Cited

U.S. PATENT DOCUMENTS

| | | | |
|---|---|---|---|
| 2,688,179 A | | 9/1954 | Greenleaf |
| 3,996,651 A | * | 12/1976 | Heaton et al. .............. 407/104 |
| 4,050,127 A | | 9/1977 | Bodem et al. |
| 4,226,560 A | * | 10/1980 | Kraemer .................... 407/101 |
| 4,552,491 A | | 11/1985 | Parker |
| 4,938,639 A | * | 7/1990 | Lockard .................... 407/103 |
| 5,035,544 A | | 7/1991 | Ikenaga et al. |
| 5,100,269 A | | 3/1992 | Lyon et al. |
| 5,810,518 A | * | 9/1998 | Wiman et al. .............. 407/102 |
| 5,855,457 A | * | 1/1999 | Arai et al. .................... 407/40 |
| 6,394,709 B1 | | 5/2002 | Sjoo et al. |

FOREIGN PATENT DOCUMENTS

SU  649-509  2/1979

* cited by examiner

*Primary Examiner*—Willmon Fridie, Jr.
(74) *Attorney, Agent, or Firm*—Larry R. Meenan

(57) ABSTRACT

The invention provides a toolholder assembly including a body and a nest that is suitable for holding an insert. The nest includes a notch and the body includes a support and protrusion that cooperates with the notch to permit indexing of the nest relative to the support. In one embodiment, the support includes a bias device, such as a spring, that at least partially biases the nest toward the support and an adjustment device that can at least partially counter the bias device. The invention is also directed to a toolholder assembly that additionally includes an insert and a clamp. The invention further contemplates a method for forming the assembly and a method for adjusting or indexing the orientation of the nest.

14 Claims, 16 Drawing Sheets

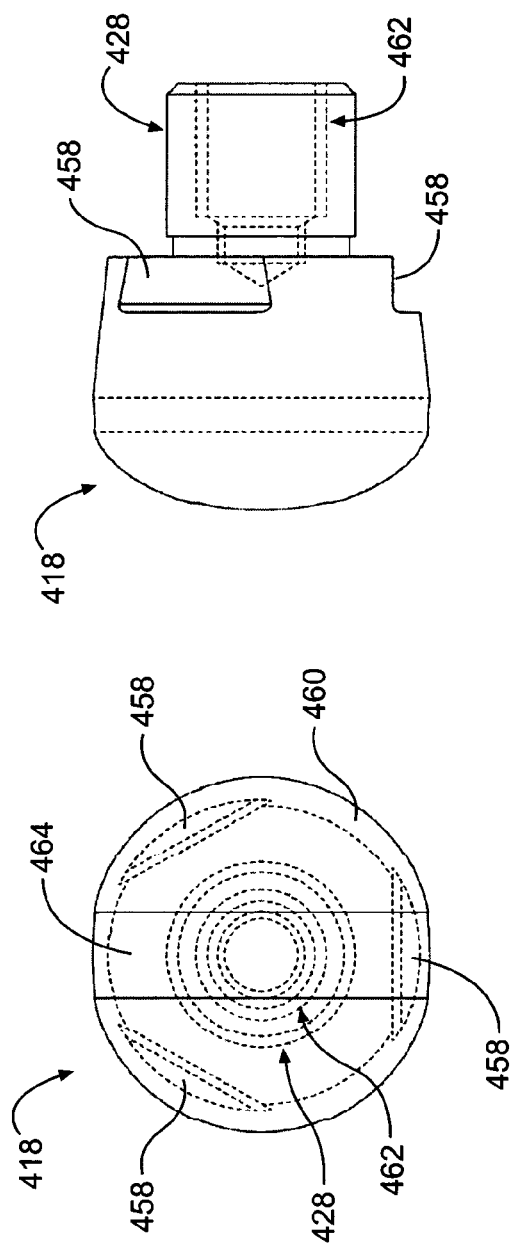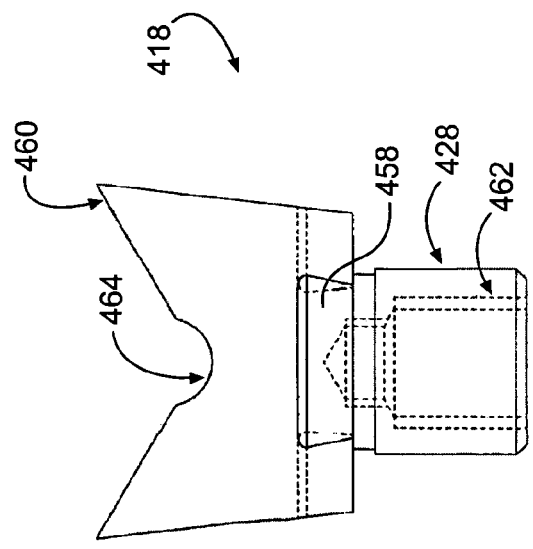

US 6,991,410 B2

TOOLHOLDER ASSEMBLY

FIELD OF THE INVENTION

The present invention relates to toolholders, including toolholders that are suitable for holding inserts, such as cutting inserts. The invention also relates to toolholder assemblies and methods related to such assemblies.

BACKGROUND OF THE INVENTION

Cutting inserts and toolholder assemblies are known in the art. Generally speaking, a number of types of inserts are commonly detachably clamped to a holder. Preferably, the inserts are securely and accurately held in place by an insert holder during operation.

Several types of toolholder systems are available in the industry. For instance, an insert with a diagonal notch may be retained in a three-sided toolholder pocket by a clamping arrangement that engages the notch in the insert and a diagonal recess in the toolholder body. In other systems, a toolholder may include a female "V" shaped nest in which an insert with a corresponding male "V" bottom is retained by a clamp that is adjustably held in the toolholder.

However, conventional toolholders are commonly fit-based and typically do not provide a method for adjusting the nest position below the insert or a clamping mechanism that is capable of moving in an angled motion over the insert. The present invention recognizes these and other needs and has developed a toolholder and assembly that are capable of providing such advantages.

SUMMARY OF THE INVENTION

The present invention comprises a toolholder including a body and a nest that is suitable for holding an insert. The nest includes a notch/notches and the body includes a support and a protrusion that cooperates with the notch/notches to permit indexing of the nest relative to the support. In one embodiment, the support includes a bias device that at least partially biases the nest toward the support. The bias device may be comprised of a spring, such as a compression spring, or other mechanical devices that provide similar functionality.

In another embodiment, the support includes an adjustment device that can at least partially counter the effect of the bias device upon the nest. The invention is also directed to toolholder assemblies that include an insert and a clamp for securing the insert. The invention further contemplates a method for forming such assemblies and a method for adjusting or indexing the orientation of the associated nest.

Various aspects and advantages of this invention will become apparent to those skilled in the art from the following detailed description, particularly when read in light of the accompanying drawings.

BRIEF DESCRIPTION OF THE DRAWINGS

FIG. 17 is a top view of the nest shown in FIG. 16.

FIG. 18 is a side elevation view of the nest shown in FIG. 16.

FIG. 19 is a front elevation view of the nest shown in FIG. 16.

DETAILED DESCRIPTION OF THE INVENTION

Figure 1:
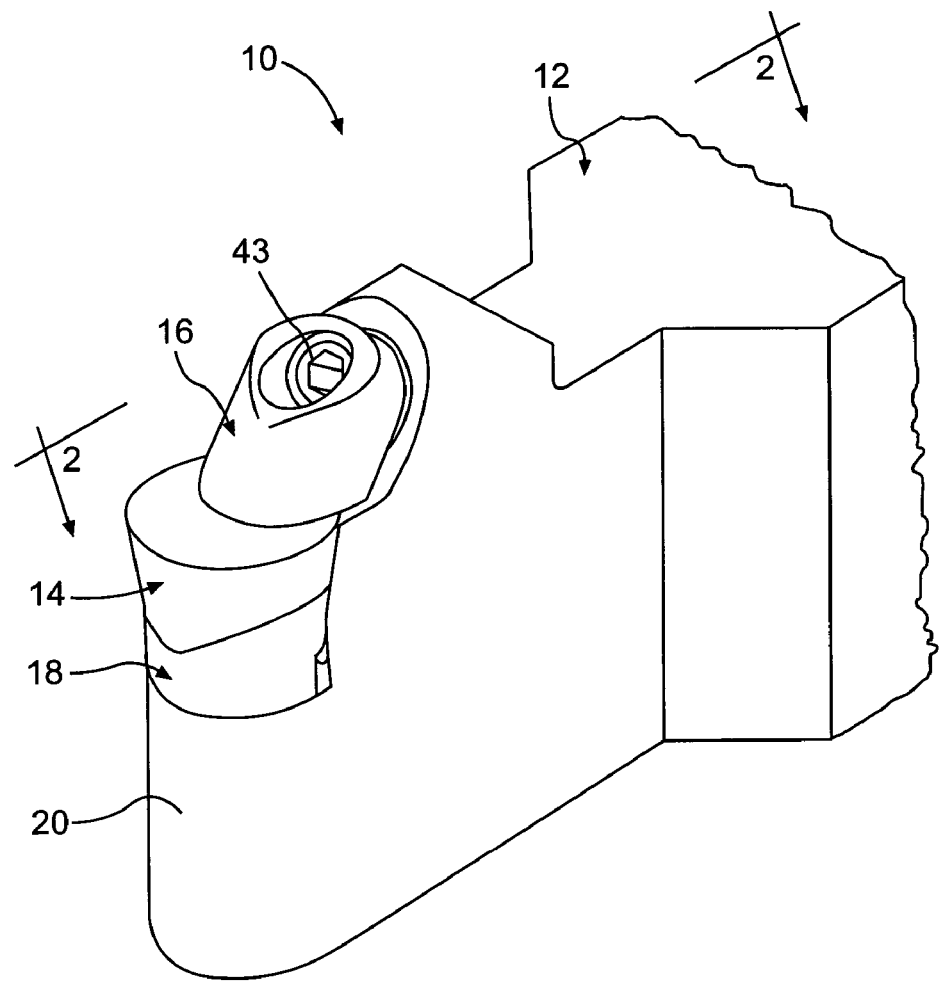
FIG. 1 is an isometric view of an embodiment of a toolholder assembly shown in accordance with the teachings of the present invention.
Figure 2:
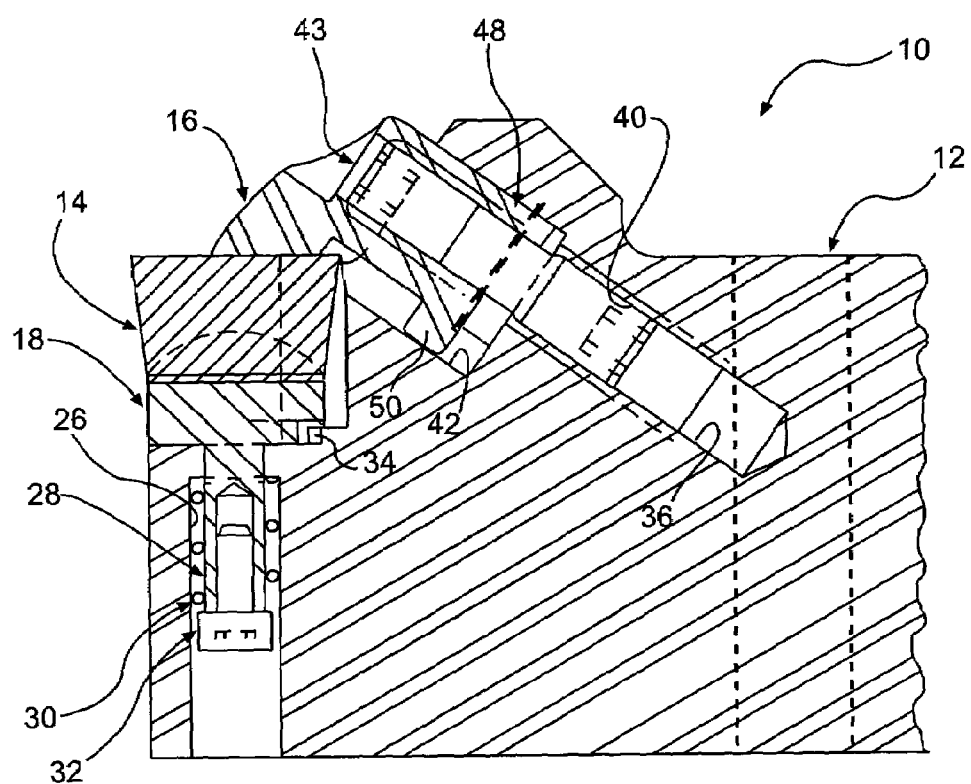
FIG. 2 is a partially cross-sectioned view of the assembly of FIG. 1 taken along line 2—2.
Figure 3:
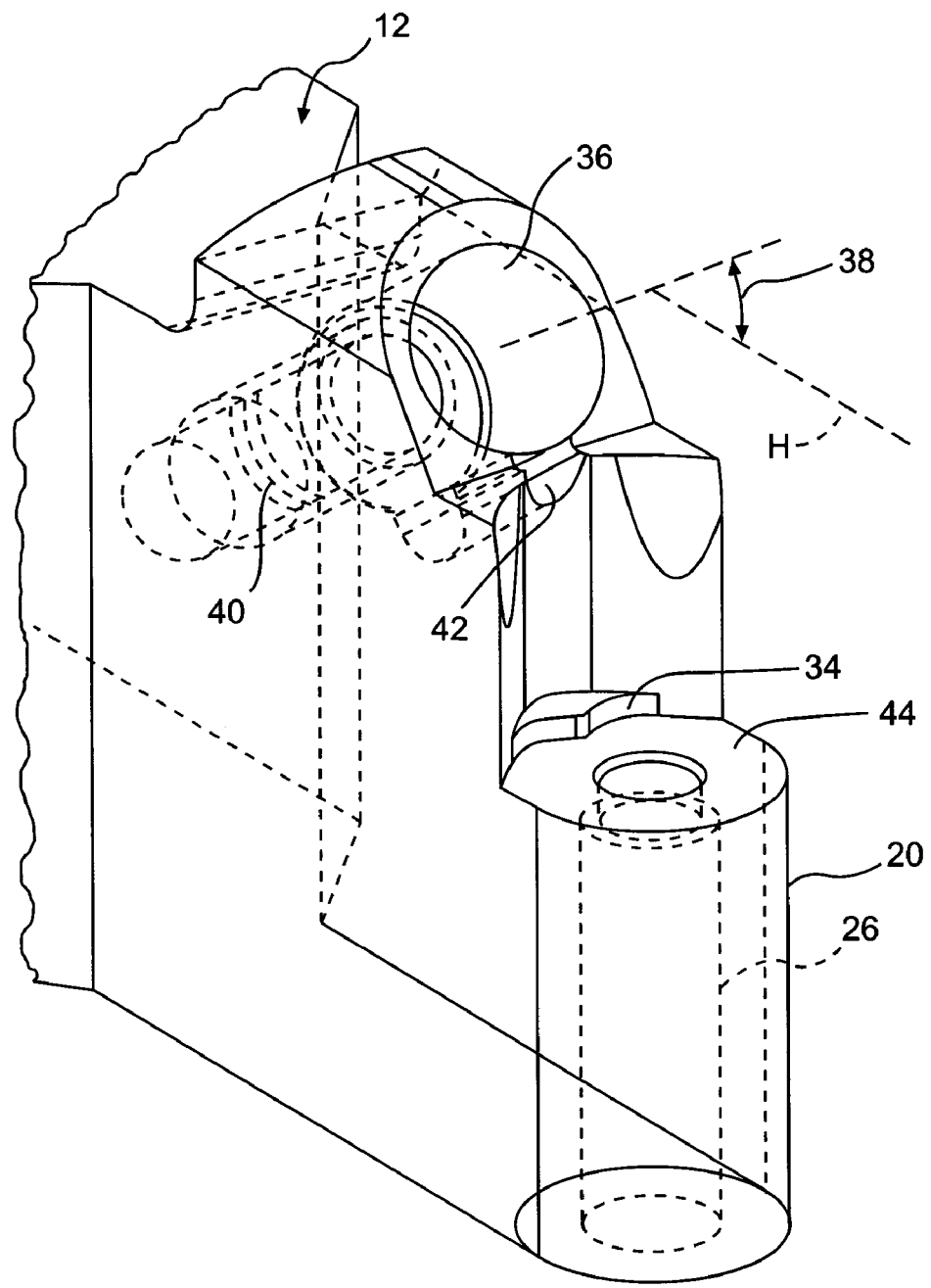
FIG. 3 is an isometric view of the toolholder assembly shown in FIG. 1 with the clamp, nest and insert removed from the toolholder assembly.

Referring now to FIGS. 1–3, a toolholder assembly, shown generally at 10, is illustrated in accordance with the teachings of the present invention. In the illustrated embodiment, the toolholder assembly 10 includes a toolholder body 12, an insert 14, a clamp 16 and a nest 18 (sometimes referred to as a "shim"). Preferably, at least a portion of the toolholder body 12, sometimes called a support 20, vertically retains or otherwise supports the nest 18 above a portion of the support 20. Moreover, support 20 includes a securing formation, which may include a cavity, slot, aperture, a substantially round through-hole, or similar structure, commonly referred to as a recess 26. To facilitate interaction, nest 18 preferably includes a corresponding securing formation, such as a mating post or stem 28. The stem 28 may take on a variety of structural configurations, without limitation, but is illustrated as comprising a substantially cylindrical post.

The support 20 preferably further includes a bias device 30 for providing a biasing force to the nest 18. The bias device may comprise a compression spring 30 or other mechanical device or structure that at least partially biases the nest 18 in the direction of, or toward, the support 20. In other words, the bias device will "pull" or "return" the nest 18 to a position adjacent to the support 20. The nest 18 may further be retained by a formation associated with the tool body 12 or support 20 to prevent undesired rotation. In a preferred embodiment, the bias device will generally permit the nest 18 to "float" above the focus point of the recess 26 to allow the nest 18 to be intentionally positioned in a plurality of rotational orientations generally coinciding with orientation formations included with the nest 18. Support 20 may also include an adjustment device, such as a screw 32 (e.g., a socket cap screw), to at least partially counterbalance or countermand the effect of the bias device 30 on the positioning of the nest 18. It should be noted that when the screw 32 is completely screwed into the stem 28, the screw 32 still allows the technician to pull the nest 18 away from the support and rotate the stem 28 to a desired orientation. Although not shown, the invention also contemplates the possible inclusion of additional elements, such as separate vertical spacers, which may be positioned between the nest 18 and the support 20.

As best seen in FIG. 3, the tool body 12 further includes at least one protrusion 34, which may be formed as part of the support 20 (for example, as illustrated in the drawings) or as a separate attachment, such as a pin (not shown) protruding from the tool body 12, or the like. In the illustrated embodiment, nest 18 includes three formations or notches 58 that allow the insert 14 to be indexed in six different orientations (3 notches×2=6 orientations). It will be appreciated that the invention is not limited by the number of notches 58 and that the invention can be practiced with any desirable number of notches 58 for indexing the insert 14.

When the nest 18 is operatively connected to the support 20 by the screw 32, the protrusion 34 cooperates with the notch 58 to permit the rotation or indexing of the nest 18 about the support 20 and/or the recess 26. For example, the nest 18 may index or rotate about a vertical axis running through the focus point of the recess 26. In the illustrated embodiment of the invention, nest 18 is effectively "spring-loaded" and notched to facilitate the lifting, rotation/indexing, and securing of the nest 18 relative to the corresponding protrusion 34 associated with the support 20.

The tool body 12 also includes a clamp screw bore 36 formed at an acute inclination angle 38 with respect to a horizontal axis, H, of the tool body 12. Although other angles are contemplated, the angle 38 is formed in the illustrated embodiment is approximately 30° with respect to the horizontal axis, H. The purpose of the acute inclination angle 38 is described below. The clamp screw bore 36 preferably includes right-hand threads 40, some of which have been omitted in FIG. 3 for clarity. A groove 42 is formed in a portion of the clamp screw bore 36. The purpose of the right-hand threads 40 and the groove 42 are described below. The upper surface of the support 20 includes a seat 44 for accommodating the nest 18.

Figure 4:
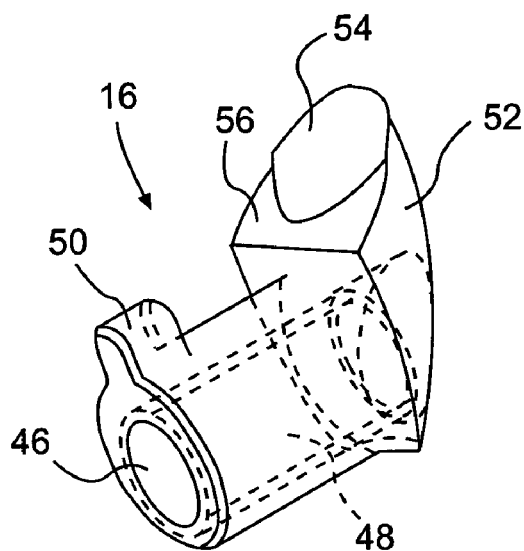
FIG. 4 is a perspective view of an embodiment of a clamp.
Figure 5:
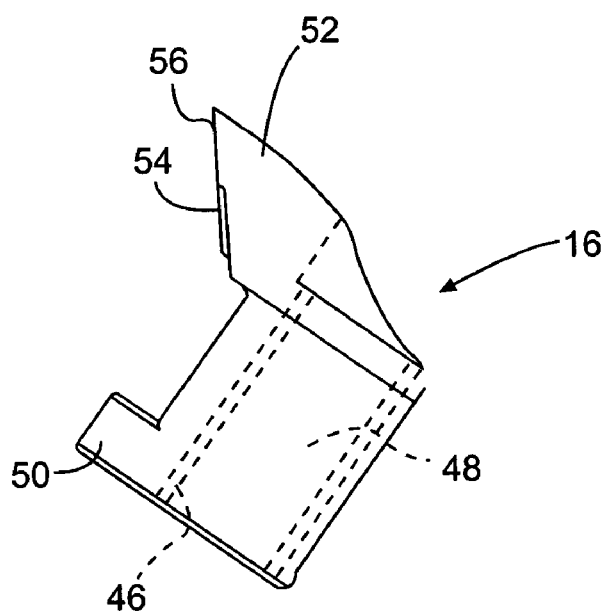
FIG. 5 is a side view of the clamp shown in FIG. 4.
Figure 6:
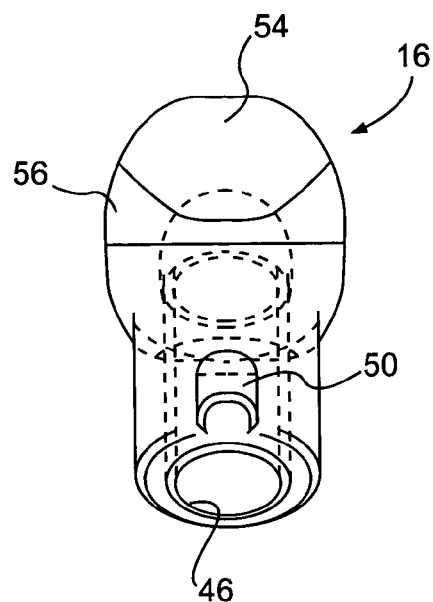
FIG. 6 is a top plan view of the clamp of FIG. 4 shown rotated slightly clockwise to better illustrate a tang.

FIGS. 4–6 further illustrate an embodiment of the clamp 16 that is arranged on the upper surface of the tool body 12. The clamp 16 is preferably used to positively secure and retain the insert 14 to the nest 18 (or some intermediate object between the nest 18 and the insert 14). The clamp 16 is of a generally C-shape in side elevation having a tapered forward portion and tapered side portions to provide a low profile design. The low profile design facilitates the removal of chips during the cutting process. The clamp 16 includes a stem portion 46 having a clamp screw bore 48 that includes left-hand threads 48, some of which have been omitted in FIGS. 4 and 5 for clarity. When properly mounted to the tool body, the clamp screw bore 48 of the clamp 16 is formed so that its axis is substantially concentric with the axis of the clamp screw bore 36 of the tool body 12.

Although the invention is not so limited, the clamp 16 is preferably retained and adjusted by a clamp screw 43 (FIG. 1), such as a differential, double-ended clamp screw, or the like. The acute inclination angle, 38, of the clamp screw bore 36 allows the clamp 16 to move downward and rearward as the clamp screw 43 is tightened. Preferably, the screw 43 has opposite threaded portions (not shown), which is inserted through the clamp screw bore 48 and screwed into the threaded clamp screw bore 36 of the tool body 12 and the threaded clamp screw bore 48 of the clamp 16. The threads 40 of the clamp screw bore 36 in the tool body 12 are threaded in a direction opposite to the threads 48 of the clamp screw bore 46 in the clamp 16. For example, the clamp screw bore 36 in the toolholder body 12 may have right hand threads 40 and the clamp screw bore 46 of the clamp 16 may have left hand threads 48. The use of a double-threaded clamp screw 43 allows the indexing of the clamp 16 to be twice as fast as conventional toolholders using spring mechanisms and the like, thereby reducing downtime and increasing production time. It will be appreciated that the threads 40, 48 of the clamp screw bores 36, 46 may be slightly larger than the threads of the clamp screw 43 to allow for variations in design, i.e. manufacturing tolerances in the toolholder 10.

The clamp 16 further includes a tang 50 that cooperates with the groove 42 of the clamp screw bore 36 to prevent unwanted rotation of the clamp 16. The clamp also includes a head portion 52 that includes a pad 54 that extends slightly outward from a bottom surface 56 of the head portion 52 for contacting the insert 14. In this manner, the bottom surface 56 does not contact the insert 14, but only the pad 54 contacts the insert 14 when the clamp 16 is tightened.

Figure 7:
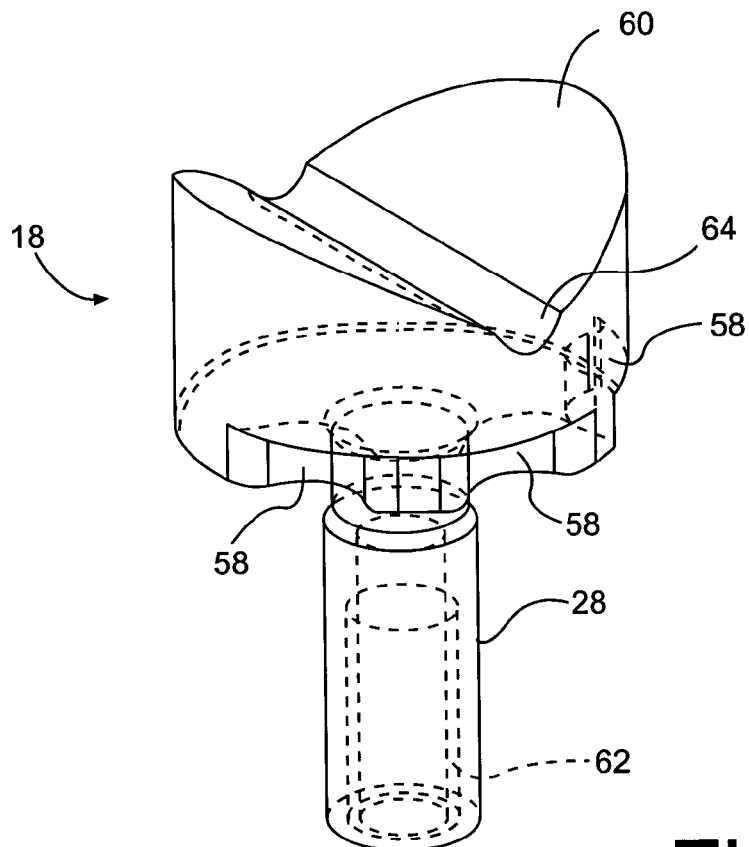
FIG. 7 is a perspective view of an embodiment of a nest.
Figure 8:
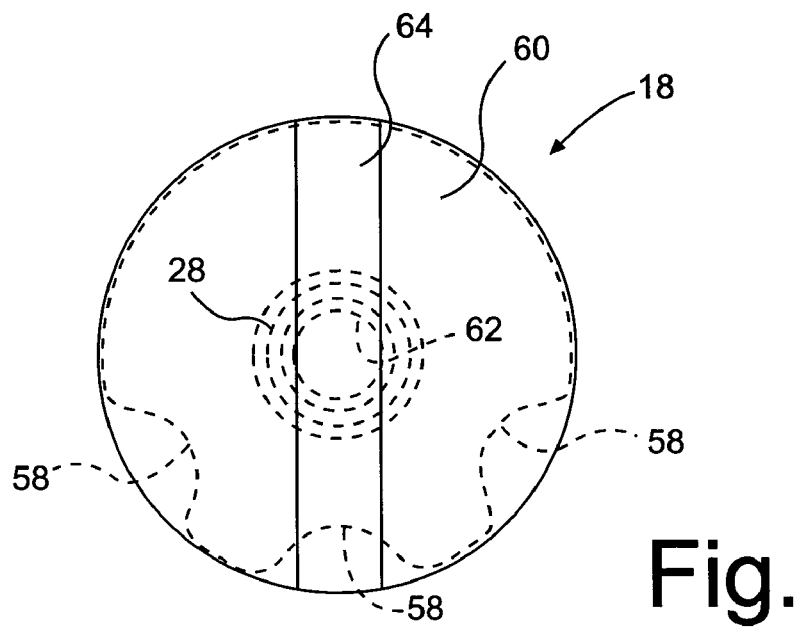
FIG. 8 is a top plan view of the nest shown in FIG. 7.
Figure 9:
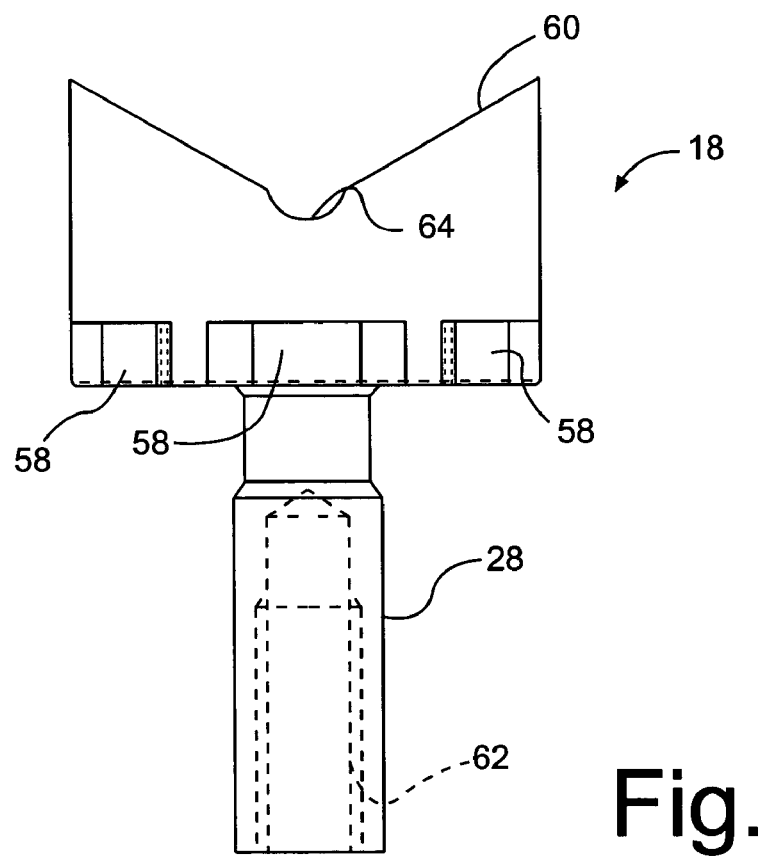
FIG. 9 is a side elevation view of the nest shown in FIG. 7.

FIGS. 7–9 further illustrate one embodiment of the nest 18 according to the invention. The nest 18 is shown with a substantially cylindrical stem 28, although other configurations are also possible and contemplated. In the illustrated embodiment of the invention, the stem 28 extends, at least partially into, the corresponding mating recess 26 (FIG. 2). The recess 26 is preferably also substantially circular and has a focus point, e.g., a point that substantially corresponds to the circular center point of the recess 26. The stem 28 includes a threaded bore 62 for interconnecting the nest 18 and the support 20 with the screw 32. It should be noted that other forms of mating or interconnection between the nest 18 and support 20, including the possible reversal of the post-recess configurations (and corresponding reversal of the structural definitions associated with the nest and support), are also contemplated by the invention, as discussed below. It should also be noted that outer diameter of the stem 28 is smaller than the bore diameter of the recess 26 so as to provide a clearance between the recess 26 and the stem 28. This clearance allows the nest 18 to "float" above the focus point of the recess 26.

While not a requirement, the nest 18 preferably includes one or more indexing notches 58. The notches 58 may be substantially similar to each other or may differ so long as they properly interact with the protrusion 34 to index the nest 18 to the support 20. The notches 58 permit the nest 18 to be configured or indexed into a plurality of alternative orientations. In the illustrated embodiment, the notches 58 are substantially arcuate to generally correspond to the profile of the protrusion 34. However, for example and without limitation, other corresponding configurations of notches 58, such as slots, wedges, or the like, are also contemplated by the invention.

Furthermore, an upper surface 60 of the nest 18 can be designed to hold a wide variety of conventional and non-conventional inserts. For example, but without limitation, the nest 18 can be used to retain a round V-bottom insert 14, as shown in the illustrated embodiment. With such a case, the present invention permits such an insert to be indexed and retained in more than the two positions (by rotating the insert 180° degrees) commonly dictated by a V-bottom insert positioned upon a conventional insert holder. For example, the insert 14 of the illustrated embodiment can be indexed and retained in six different orientations. By allowing the insert 14 to be indexed and retained in more orientations than conventional toolholders, the toolholder 10 of the invention provides substantial cost savings to the consumer. The upper surface 60 of the nest 18 may also include a recess 64 to prevent binding of the insert 14 when positively secured by the clamp 16.

Figure 10:
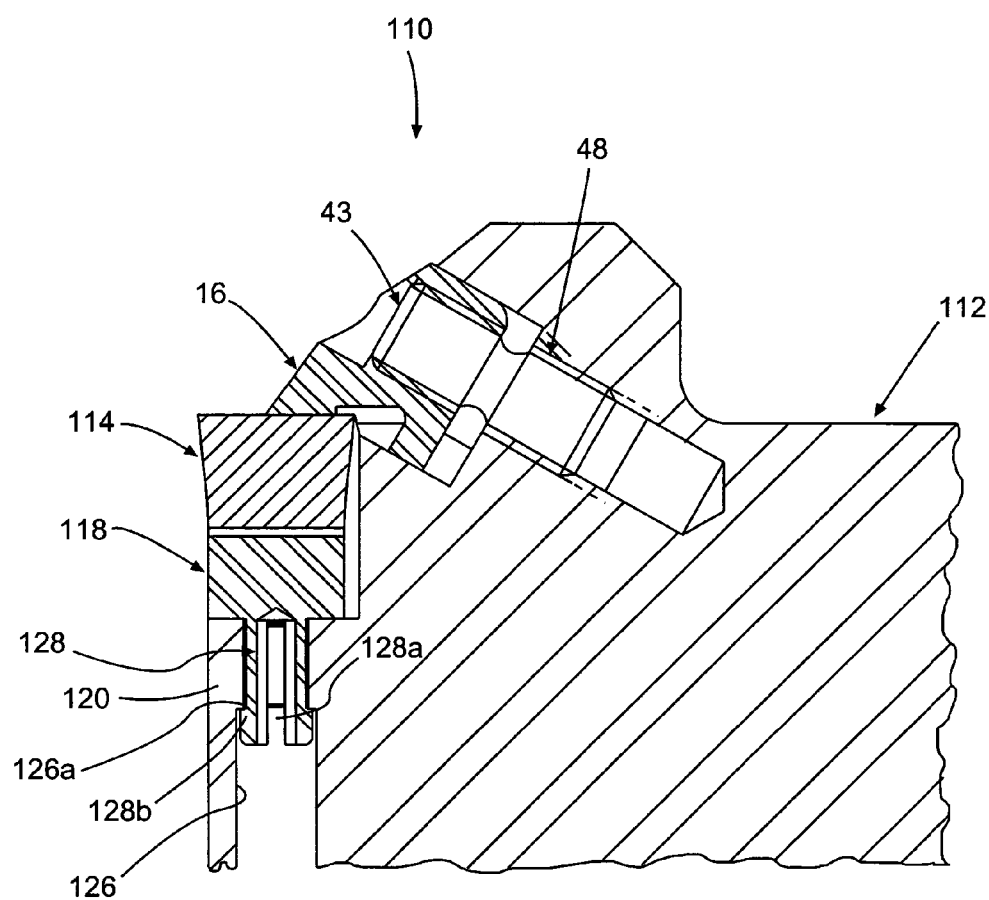
FIG. 10 is a partially cross-sectioned perspective view of an alternate embodiment of a toolholder assembly in accordance with the teaching of the present invention.

As mentioned earlier, other configurations of the nest 18 with the substantially cylindrical stem 28 that can partially extend into the substantially circular recess 26 having a generally corresponding cross-sectional shape are also possible and contemplated by the invention. For example, a toolholder assembly, shown generally at 110, is shown according to another embodiment of the invention in FIG. 10. In this embodiment, the toolholder assembly 110 includes a nest 118 with a stem 128 that can partially extend into a cooperating recess 126 of a tool body 112. The stem 128 includes a cutout portion 128a that allows the stem 128 to flex inwardly as the stem 128 is partially inserted into the recess 126. After the stem 128 is properly inserted into the recess 126, the stem 128 flexes outwardly (toward the walls of the recess 126) due to the resilient nature of the stem 128. The stem 128 may also includes a ledge 128b that cooperates with a ledge 126a of the recess 126 when properly inserted into the recess 126 to adequately secure the nest 118 in place.

It should be noted that the alternate embodiment of the toolholder assembly 110 also includes an insert 114 having a substantially flat bottom, rather than the V-shaped bottom as in the earlier embodiment. Likewise, the upper surface of the nest 118 is substantially flat to correspond to the insert 114.

Figure 11:
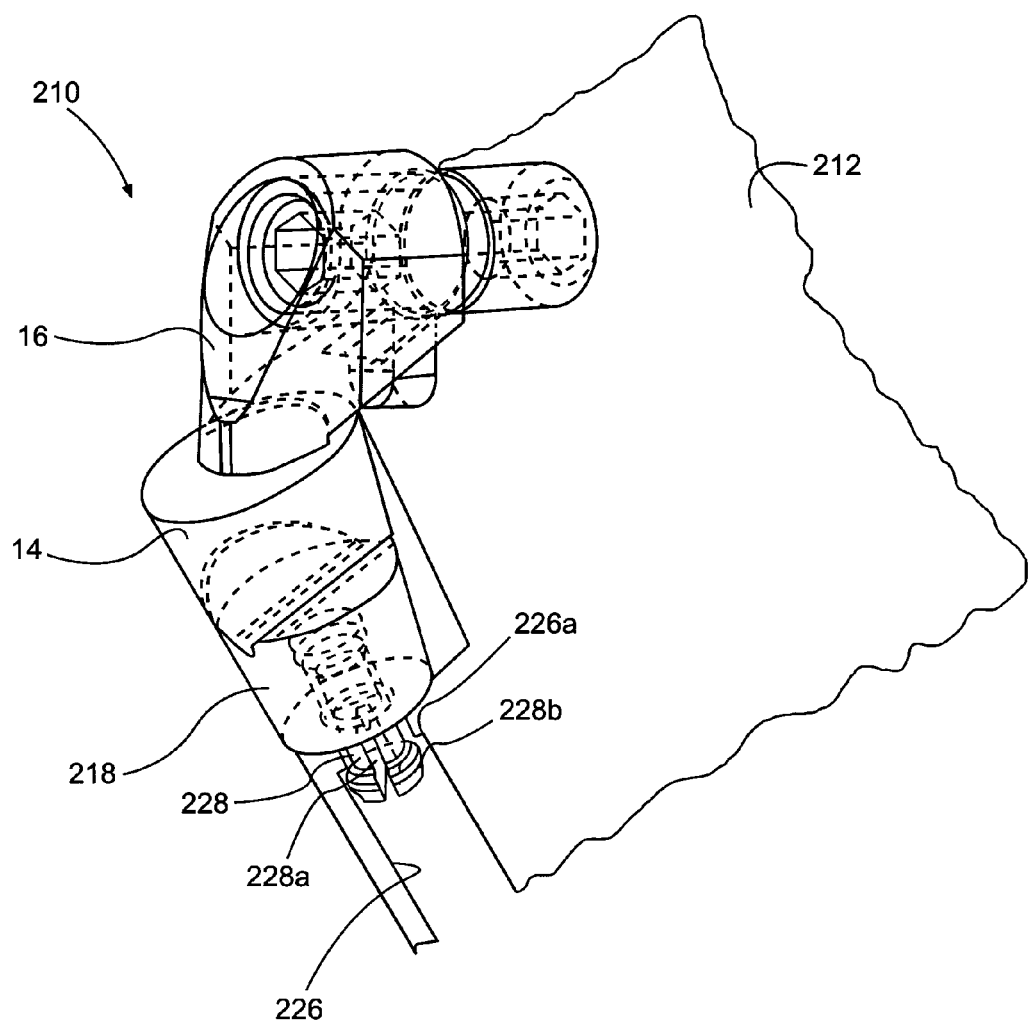
FIG. 11 is a partially cross-sectioned perspective view of another alternate embodiment of a toolholder assembly in accordance with the teaching of the present invention.

FIG. 11 illustrates a toolholder assembly, shown generally at 210, according to another embodiment of the invention. In accordance with this embodiment of the invention, the nest 218 includes a stem 228 that is not integrally formed with the nest 218, unlike the earlier embodiments of the invention in which the stem is integrally formed with the nest. The stem 228 comprises a cutout portion 228a that allows the stem 228 to flex inwardly as the stem 228 is partially inserted into the recess 226. After the stem 228 is properly inserted into the recess 226, the stem 228 flexes outwardly (toward the walls of the recess 226) due to the resilient nature of the stem 228. One end of the stem 228 also includes an enlarged end portion 228b that cooperates with a ledge 226a of the recess 226 when properly inserted into the recess 226 to adequately secure the nest 218 to the tool body 212.

Figure 12:
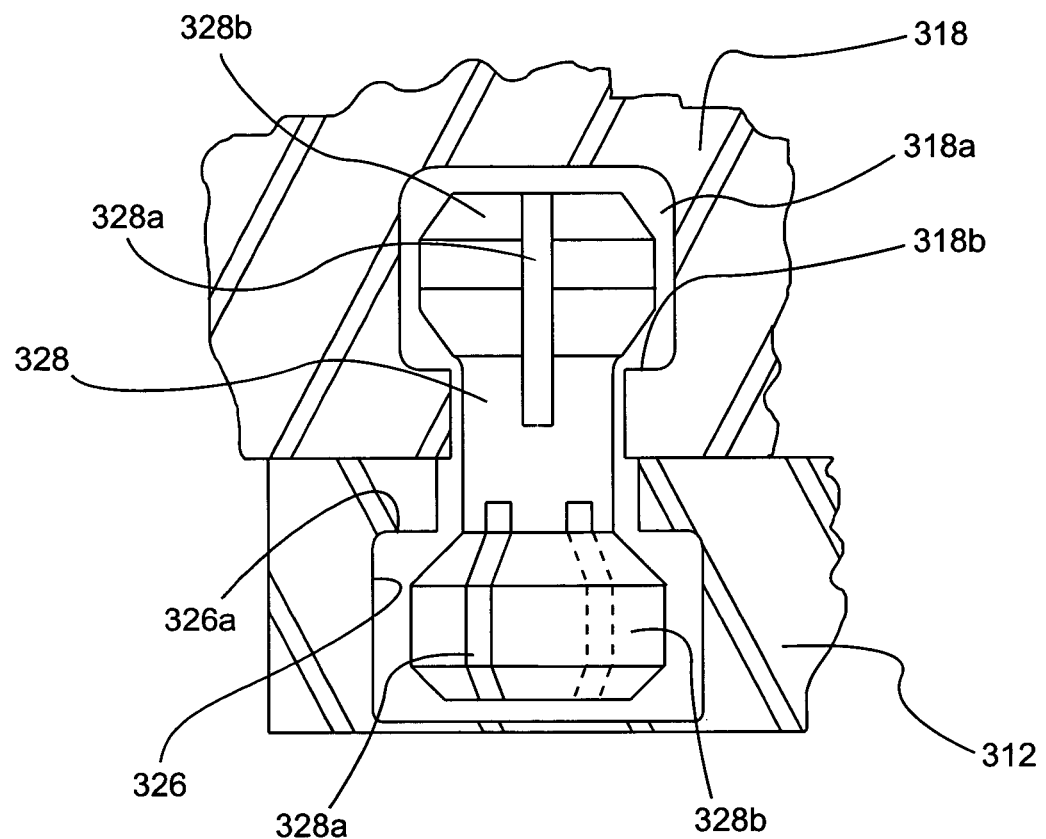
FIG. 12 is a cross-sectioned view of an alternate embodiment of a toolholder assembly in accordance with the teaching of the present invention.

FIG. 12 shows another embodiment of the invention in which both ends of a stem 328 includes cutout portions 328a and enlarged end portions 328b. To accommodate the additional enlarged end portion 328b, the nest 318 includes a undercut recess 318a forming a ledge 318b, in addition to the tool body 312 including an undercut recess 326 forming a ledge 326a to adequately secure the nest 318 to the tool body 312.

Figure 13:
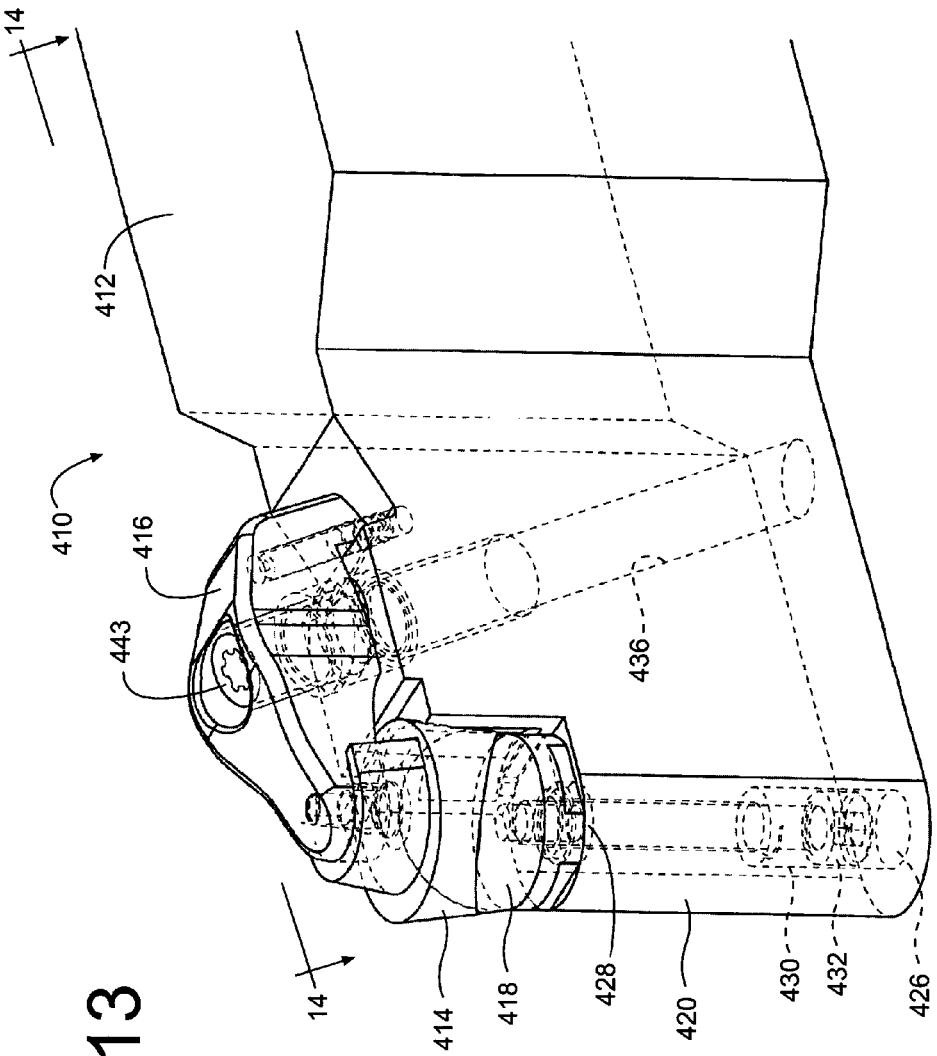
FIG. 13 is an isometric view of another embodiment of a toolholder assembly shown in accordance with the teachings of the present invention.
Figure 14:
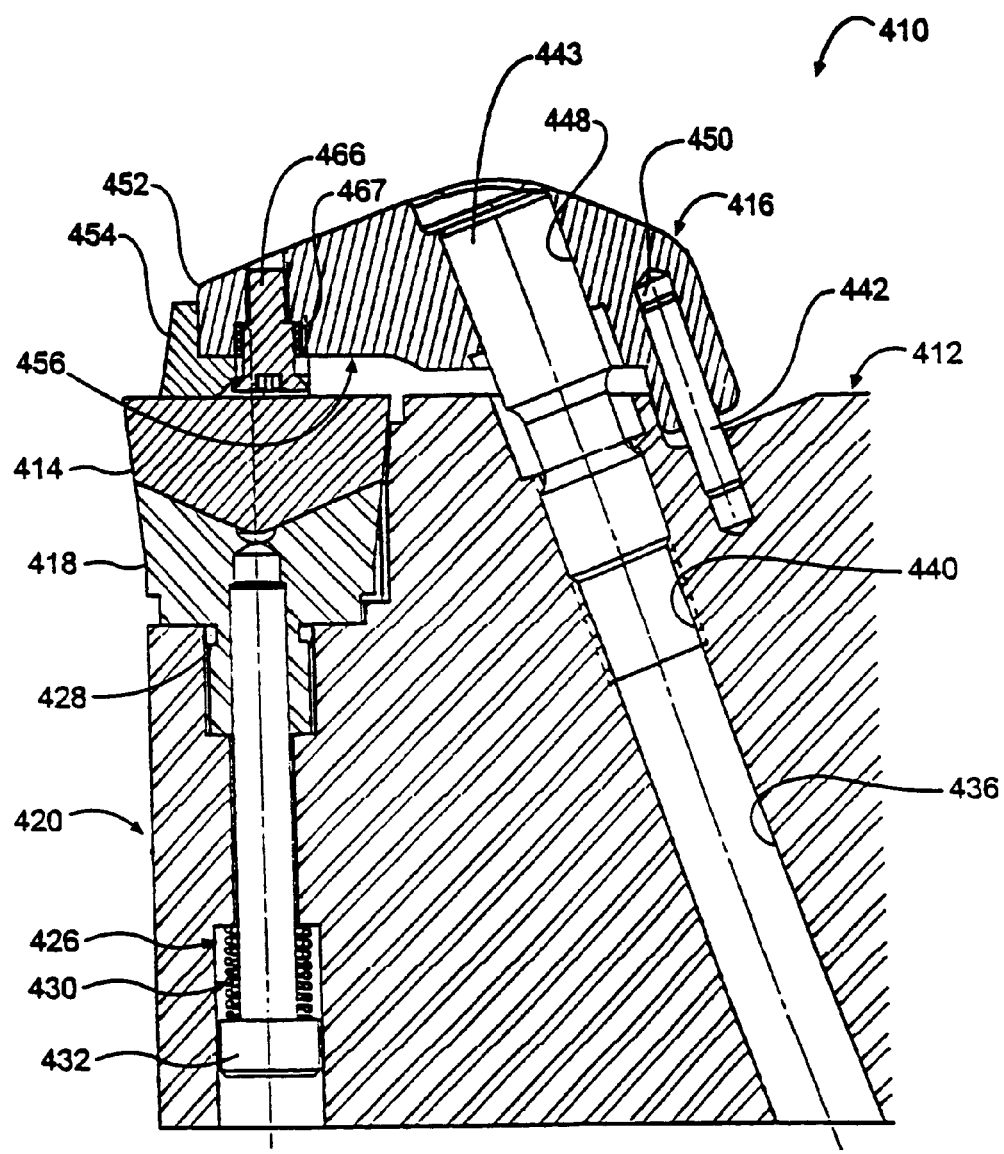
FIG. 14 is a partially cross-sectioned view of the assembly of FIG. 13 taken along line 14—14.

Referring now to FIGS. 13 and 14, a toolholder assembly, shown generally at 410, is illustrated in accordance with another embodiment of the invention. In the illustrated embodiment, the toolholder assembly 410 includes a toolholder body 412, an insert 414, a clamp 416 and a nest 418 (sometimes referred to as a "shim"). Preferably, at least a portion of the toolholder body 412, sometimes called a support 420, vertically retains or otherwise supports the nest 418 above a portion of the support 420. Moreover, support 420 includes a securing formation, which may include a cavity, slot, aperture, a substantially round through-hole, or similar structure, commonly referred to as a recess 426. To facilitate interaction, nest 418 preferably includes a corresponding securing formation, such as a mating post or stem 428. The stem 428 may take on a variety of structural configurations, without limitation, but is illustrated as comprising a substantially cylindrical post.

The support 420 preferably further includes a bias device for providing a biasing force to the nest 418. The bias device may comprise a compression spring 430 or other mechanical device or structure that at least partially biases the nest 418 in the direction of, or toward, the support 420. In other words, the bias device will "pull" or "return" the nest 418 to a position adjacent to the support 420. The nest 418 may further be retained by a formation associated with the tool body 412 or support 420 to prevent undesired rotation. In a preferred embodiment, the bias device will generally permit the nest 418 to "float" above the focus point of the recess 426 to allow the nest 418 to be intentionally positioned in a plurality of rotational orientations generally coinciding with orientation formations included with the nest 418. Support 420 may also include an adjustment device, such as a screw 432 (e.g., a socket cap screw), to at least partially counterbalance or countermand the effect of the bias device 430 on the positioning of the nest 418. It should be noted that when the screw 432 is completely screwed into the stem 428, the screw 432 still allows the technician to pull the nest 418 away from the support and rotate the stem 428 to a desired orientation. Although not shown, the invention also contemplates the possible inclusion of additional elements, such as separate vertical spacers, which may be positioned between the nest 418 and the support 420.

Figure 15:
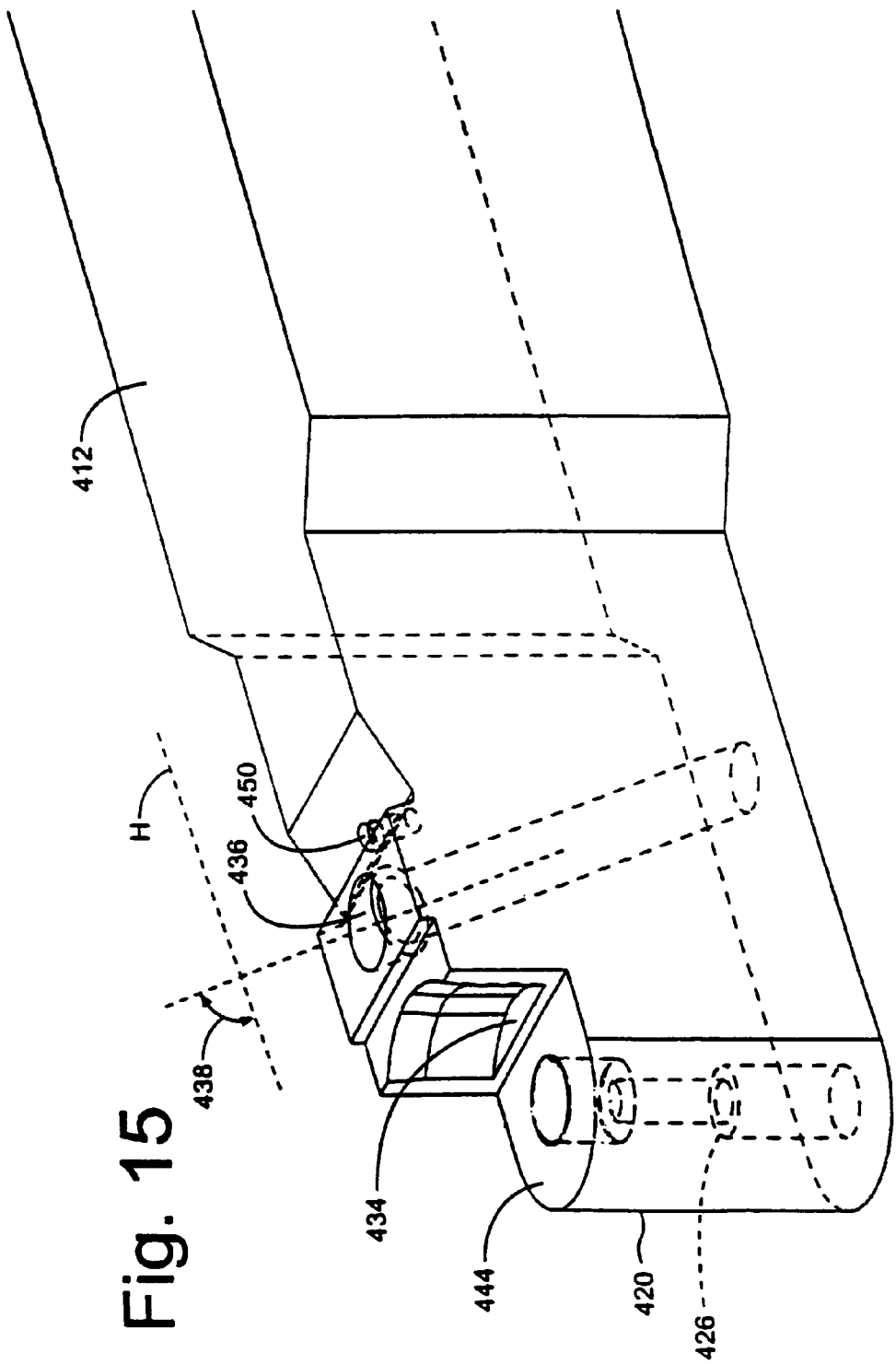
FIG. 15 is an isometric view of the toolholder assembly shown in FIG. 13 with the clamp, nest and insert removed.
Figure 16:
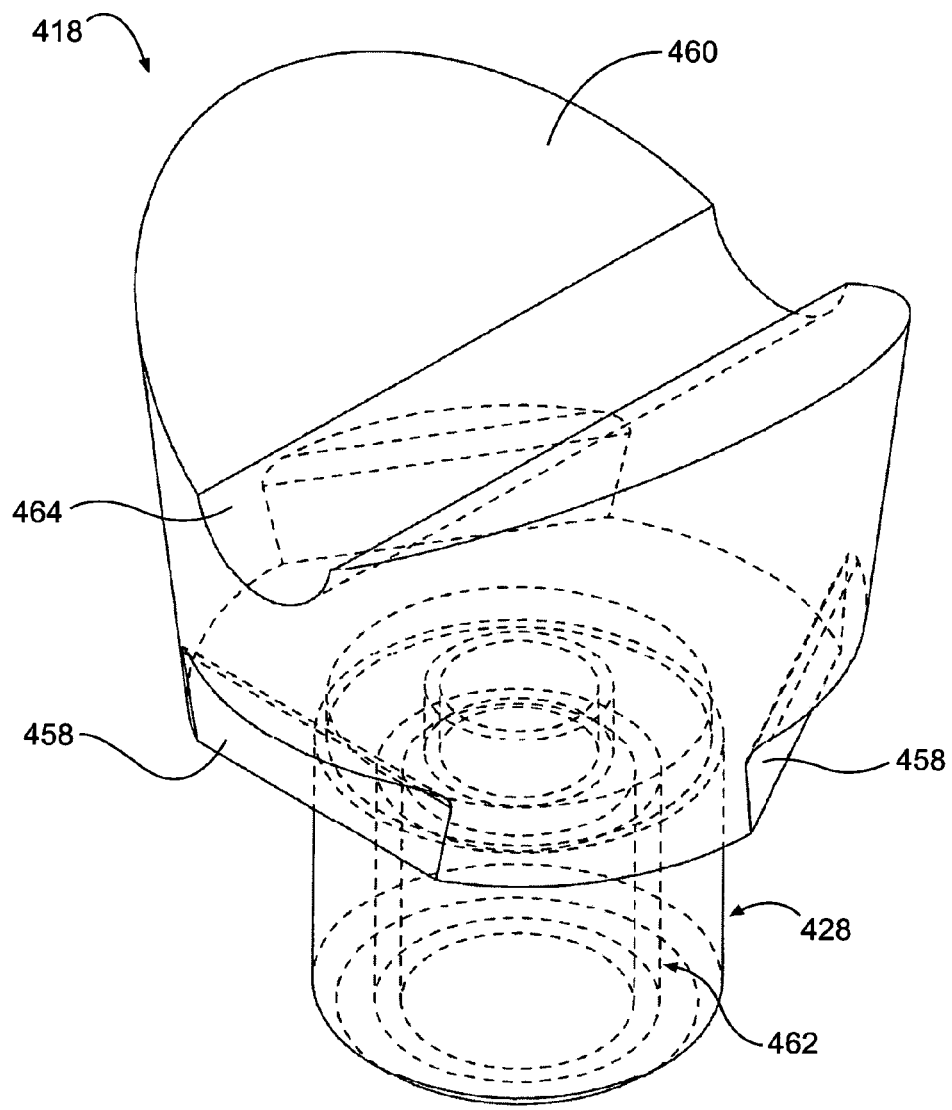
FIG. 16 is a perspective view of an embodiment of a nest.

As best seen in FIG. 15, the tool body 412 further includes at least one protrusion 434, which may be formed as part of the support 420 (for example, as illustrated in the drawings) or as a separate attachment, such as a pin (not shown) protruding from the tool body 412, or the like. In the illustrated embodiment, nest 418 includes three formations or notches 458 (FIG. 16) that allow the insert 414 to be indexed in six different orientations (3 notches×2=6 orientations). It will be appreciated that the invention is not limited by the number of notches 458 and that the invention can be practiced with any desirable number of notches 458 for indexing the insert 414.

When the nest 418 is operatively connected to the support 420 by the screw 432, the protrusion 434 cooperates with the notch 458 to permit the rotation or indexing of the nest 418 about the support 420 and/or the recess 426. For example, the nest 418 may index or rotate about a vertical axis running through the focus point of the recess 426. In the illustrated embodiment of the invention, nest 418 is effectively "spring-loaded" and notched to facilitate the lifting, rotation/indexing, and securing of the nest 418 relative to the corresponding protrusion 434 associated with the support 420.

The tool body 412 also includes a clamp screw bore 436 formed at an acute inclination angle 438 with respect to a horizontal axis, H, of the tool body 412. Although other angles are contemplated, the angle 438 as formed in the illustrated embodiment is approximately 70° with respect to the horizontal axis, H. The purpose of the acute inclination angle 438 is described below. The clamp screw bore 436 preferably includes right-hand threads 440, some of which have been omitted in FIG. 15 for clarity. The purpose of the right-hand threads 440 is described below. The upper surface of the support 420 includes a seat 444 for accommodating the nest 418.

FIGS. 16–19 further illustrate a preferred embodiment of the nest 418. The nest 418 is shown with a substantially cylindrical stem 428, although other configurations are also possible and contemplated. In the illustrated embodiment of the invention, the stem 428 extends, at least partially into, the corresponding mating recess 426 (FIG. 13). The recess 426 is preferably also substantially circular and has a focus point, e.g., a point that substantially corresponds to the circular center point of the recess 426. The stem 428 includes a threaded bore 462 for interconnecting the nest 418 and the support 420 with the screw 432. It should be noted that other forms of mating or interconnection between the nest 418 and support 420, including the possible reversal of the post-recess configurations (and corresponding reversal of the structural definitions associated with the nest and support), are also contemplated by the invention, as discussed below. It should also be noted that outer diameter of the stem 428 is smaller than the bore diameter of the recess 426 so as to provide a clearance between the recess 426 and the stem 428. This clearance allows the nest 418 to "float" above the focus point of the recess 426.

While not a requirement, the nest 418 preferably includes one or more indexing notches 458. The notches 458 may be substantially similar to each other or may differ so long as they properly interact with the protrusion 434 to index the nest 418 to the support 420. The notches 458 permit the nest 418 to be configured or indexed into a plurality of alternative orientations. In the illustrated embodiment, the notches 458 are substantially flat to generally correspond to the profile of the protrusion 434. However, for example and without limitation, other corresponding configurations of notches 458, such as slots, wedges, or the like, are also contemplated by the invention.

Figure 20:
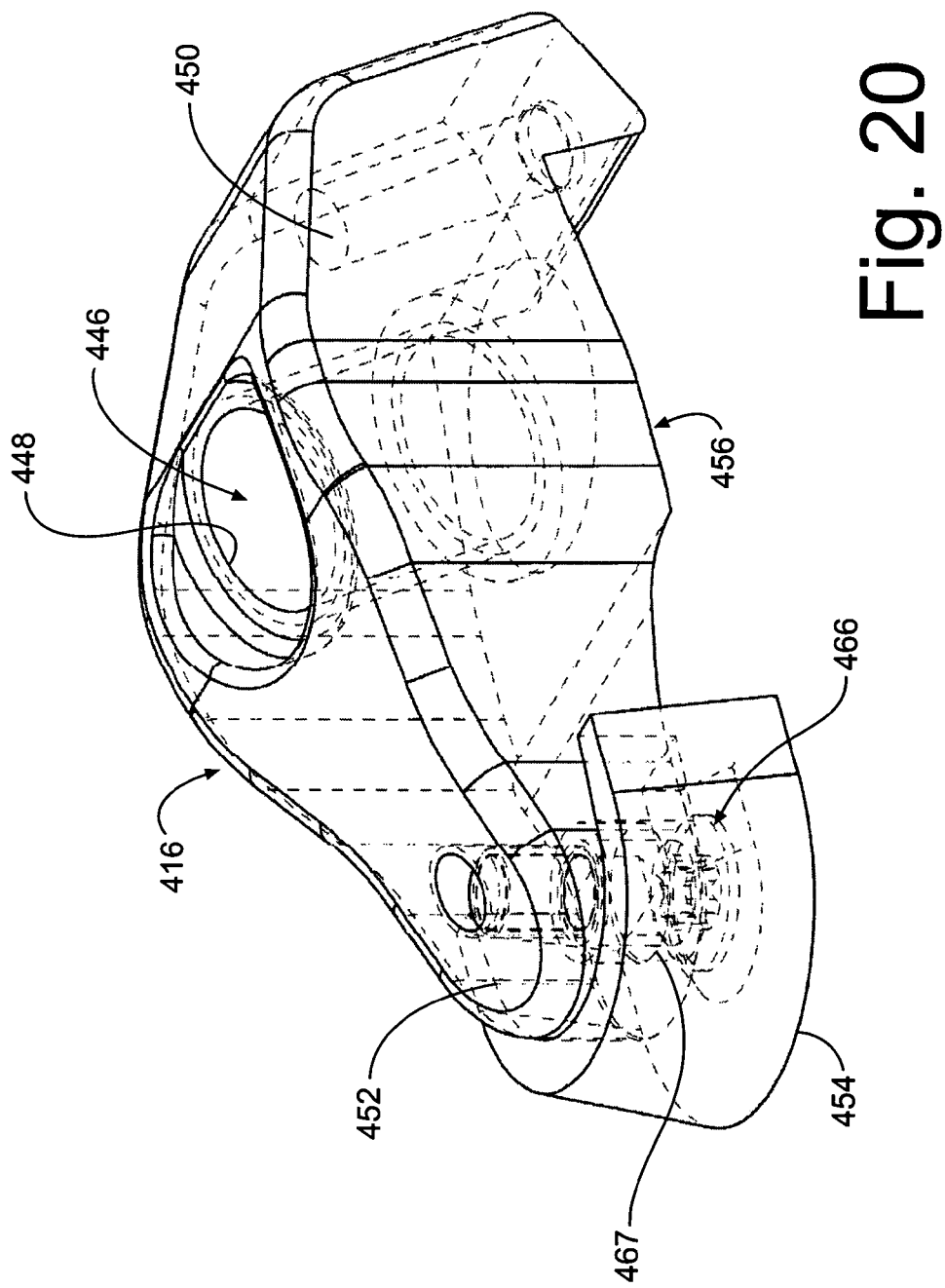
FIG. 20 is an isometric view of an alternate embodiment of a clamp assembly in accordance with the teachings of the present invention.
Figure 21:
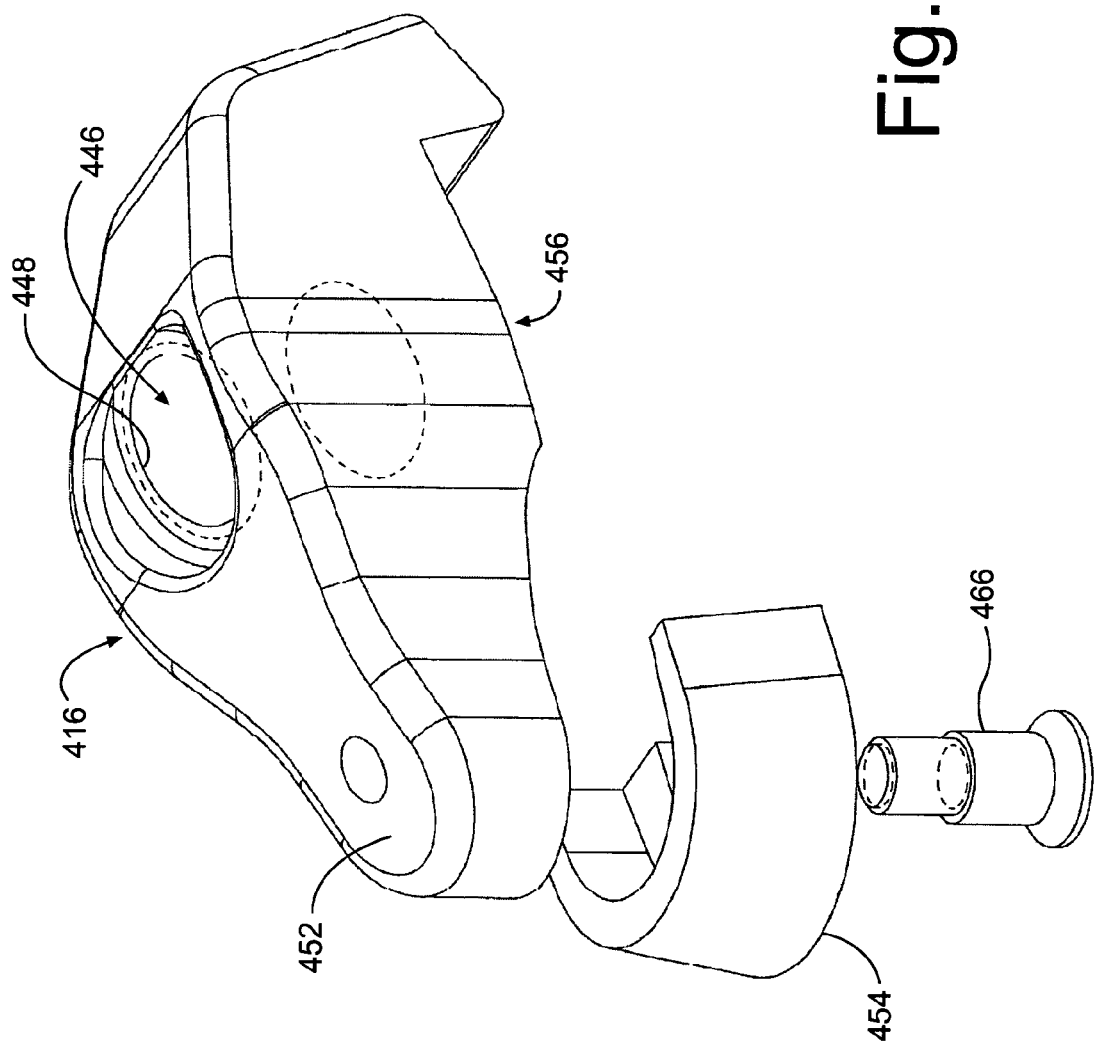
FIG. 21 is an exploded isometric view of FIG. 20.

FIGS. 20 and 21 further illustrate an embodiment of the clamp 416 that is arranged on the upper surface of the tool body 412. The clamp 416 is preferably used to positively secure and retain the insert 414 to the nest 418. The clamp 416 includes a portion 446 having a clamp screw bore 448 that includes left-hand threads, some of which have been omitted in FIGS. 20 and 21 for clarity. When properly mounted to the tool body 412, the clamp screw bore 448 of the clamp 416 is formed so that its axis is substantially concentric with the axis of the clamp screw bore 436 of the tool body 412.

Although the invention is not so limited, the clamp 416 is preferably retained and adjusted by a clamp screw 443 (FIG. 13), such as a differential, double-ended clamp screw, or the like. The acute inclination angle, 438, of the clamp screw bore 436 allows the clamp 416 to move downward and rearward as the clamp screw 443 is tightened. Preferably, the screw 443 has opposite threaded portions (FIG. 14), which is inserted through the clamp screw bore 448 and screwed into the threaded clamp screw bore 436 of the tool body 412 and the threaded clamp screw bore 448 of the clamp 416. The threads 440 of the clamp screw bore 436 in the tool body 412 are threaded in a direction opposite to the threads 448 of the clamp screw bore 446 in the clamp 416. For example, the clamp screw bore 436 in the toolholder body 412 may have right hand threads 440 and the clamp screw bore 446 of the clamp 416 may have left hand threads 448. The use of a double-threaded clamp screw 443 allows the releasing movement of the clamp 416 to be twice as fast as the conventional toolholders using clamps having a screw with only right hand threads with spring mechanisms and the like, thereby reducing downtime and increasing production time.

As best seen in FIGS. 14, 20 and 21, the clamp 416 further includes a hole 450 that cooperates with the pin 442 of the clamp 416 to prevent unwanted rotation of the clamp 416. The clamp 416 also includes a pad 454 that extends slightly outward from a bottom surface 456 of the head portion 452 for contacting the insert 414. The pad 454 acts as a chip deflector wear pad. The pad 454 may be replaceable and conforms to the outer surface of the clamp 416, thereby protecting the insert during metalcutting operations. In this manner, the bottom surface 456 does not contact the insert 414, but only the pad 454 contacts the insert 414 when the clamp 416 is tightened. The pad 454 is held in place with a screw 466 and a spring 467 that allows the pad 454 to "float" on the head portion 452 of the screw 466. The head of the screw 466 is conical in shape and is received in a similar shaped opening of the pad.

It will be understood from the alternate embodiments of the invention as described above; many other alternate embodiments of the invention can be contemplated in which the stem of the nest, whether or not integrally formed with the nest, can be formed to cooperate with the support of the tool body to adequately secure the nest to the tool body. Thus, the invention is not limited by the embodiments of the invention described above, and that the invention can be practiced with other equivalent structures in which the stem of the nest cooperates with the recess in the tool body.

The invention also contemplates a method for providing an assembly, such as a toolholder assembly. The method comprises: providing a tool body with a protrusion and a support with a securing formation; providing a nest with a notch and securing formation; positioning the nest above the support such that at least a portion of the securing formation of the stem is in communication with at least a portion of the securing formation of the nest and such that the protrusion and notch cooperate to permit the positioning of the nest in a certain orientation; providing an insert for connection to the nest and positioning the insert above the nest; providing a clamp with a segment that is positioned above the insert; and adjusting the segment of the clamp to secure the insert relative to the nest.

A method for adjusting an assembly according to the present invention may include: (a) providing a tool body with a protrusion and a support with a securing formation and bias device; a nest with a plurality of notches and securing formation that is positioned above the support such that at least a portion of the securing formation of the stem is in communication with at least a portion of the securing formation of the nest and such that the protrusion and notches cooperate to permit the positioning of the nest in a plurality of orientations; an insert connected to and positioned above the nest; and a clamp that includes a segment positioned above the insert that secures the insert relative to the nest; (b) adjusting the clamp to create a clearance between the clamp and the insert; (c) lifting the nest vertically in at least partial opposition to the force exerted by the bias device urging the nest in the direction of the support; (d) turning the nest to present a different notch to the protrusion; (e) permitting the nest to reseat in connection with the support; and (f) securing the insert between the clamp and nest.

Although certain preferred embodiments of the present invention have been described, the invention is not limited to the illustrations and embodiments described and shown herein, which are deemed to be merely illustrative of the best modes of carrying out the invention. Those skilled in the art will readily appreciate that many modifications to the exemplary embodiments are possible without materially departing from the novel teachings and advantages of the invention. Accordingly, all such modifications are intended to be included within the spirit and the scope of the invention as defined in the following claims. Further, where present in the claims, means-plus-function clauses are intended to cover the structures described herein as performing the recited function and not only structural equivalents, but also equivalent structures. Thus, although a nail and a screw may not be structural equivalents, a nail and a screw may be equivalent structures.

What is claimed is:

1. A toolholder comprising:
   a tool body, including a support and a protrusion; and
   a nest positioned above the support, the nest including a notch,
   wherein the protrusion and notch cooperate to permit the indexing of the nest about the support, wherein the nest includes a stem, the support includes a recess, and the stem of the nest extends at least partially into the recess of the support.

2. A toolholder according to claim 1, wherein the support includes a bias device that at least partially biases the nest toward the support.

3. A toolholder according to claim 2, wherein the bias device includes a spring.

4. A toolholder according to claim 3, wherein the spring comprises a compression spring.

5. A toolholder according to claim 1, including an adjustment device that can at least partially counter the bias device.

6. A toolholder according to claim 5, wherein the adjustment device includes a screw.

7. A toolholder according to claim 1, wherein the recess includes a focus point and the nest is permitted to float above the focus point of the recess to allow the nest to be positioned in a plurality of orientations.

8. A toolholder according to claim 7, wherein the recess is substantially circular and the focus point is substantially located at the center point of the circular recess.

9. A toolholder according to claim 1, wherein the nest includes a plurality of notches.

10. A toolholder according to claim 1, including a means for permitting the vertical lifting of the nest and the biasing the nest toward the support.

11. A toolholder comprising:
    a tool body, including a support having a recess;
    a nest positioned above the support, the nest including a stem;
    means for biasing the nest toward the support; and
    means for permitting the indexing of the nest in different orientations about the support, wherein the stem of the nest extends at least partially into the recess of the support.

12. An assembly comprising:
    a tool body, including a support and a protrusion;
    a nest positioned above the support, the nest including a notch and a stem;
    an insert having a lower portion, the lower portion of the insert positioned above the nest; and
    a clamp for securing the insert relative to the nest,
    wherein the protrusion and notch cooperate to permit the indexing of the nest about the support, wherein the support includes a recess, and the stem of the nest extends at least partially into the recess of the support.

13. An assembly according to claim 12, wherein the support includes a bias device that at least partially biases the nest toward the support.

14. An assembly according to claim 13, including an adjustment device for at least partially countering the bias device.

* * * * *